United States Patent

Fu

(10) Patent No.: US 12,348,458 B2
(45) Date of Patent: Jul. 1, 2025

(54) WIRELESS COMMUNICATION METHOD, COMMUNICATION DEVICE, AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 373 days.

(21) Appl. No.: 18/014,018

(22) PCT Filed: Jul. 3, 2020

(86) PCT No.: PCT/CN2020/100271
§ 371 (c)(1),
(2) Date: Dec. 30, 2022

(87) PCT Pub. No.: WO2022/000510
PCT Pub. Date: Jan. 6, 2022

(65) Prior Publication Data
US 2023/0353330 A1    Nov. 2, 2023

(51) Int. Cl.
*H04W 72/51* (2023.01)
*H04L 5/00* (2006.01)
*H04W 72/12* (2023.01)

(52) U.S. Cl.
CPC ........... *H04L 5/0091* (2013.01); *H04W 72/12* (2013.01); *H04W 72/51* (2023.01)

(58) Field of Classification Search
CPC .............................. H04W 72/51; H04W 72/12

USPC ......................................................... 370/329
See application file for complete search history.

(56) References Cited

U.S. PATENT DOCUMENTS

| | | |
|---|---|---|
| 2019/0141520 A1 | 5/2019 | Li et al. |
| 2019/0253925 A1 | 8/2019 | Gholmieh et al. |
| 2019/0254060 A1 | 8/2019 | Li |
| 2020/0053755 A1 | 2/2020 | Ang et al. |

FOREIGN PATENT DOCUMENTS

| | | |
|---|---|---|
| CN | 109803430 A | 5/2019 |
| CN | 109891988 A | 6/2019 |
| CN | 110115053 A | 8/2019 |
| CN | 110324123 A | 10/2019 |
| CN | 110719631 A | 1/2020 |
| CN | 110753341 A | 2/2020 |
| CN | 111316581 A | 6/2020 |
| WO | 2020/065978 A1 | 4/2020 |

OTHER PUBLICATIONS

Chinese Office Action issued on Dec. 18, 2023 for Chinese Patent Application No. 2020800014309.
CMCC. "FL Summary on support of unaligned frame boundary for R16 NR inter-band CA" 3GPP TSG RAN WG1 #99 R1-1913510, (Nov. 22, 2019).
CATT,"Correction on PDSCH processing capability 2 with scheduling limitation of SCS 30KHz",3GPP TSG-RAN WG1 Meeting #97, R1-1906301, Reno, USA, May 13-17, 2019.

*Primary Examiner* — Angel T Brockman
(74) *Attorney, Agent, or Firm* — Volpe Koenig

(57) ABSTRACT

A wireless communication method, applied to a terminal. The method includes: reporting terminal capability information, where the terminal capability information is at least used for indicating a processing capability of the terminal at different subcarrier spacing (SCS).

20 Claims, 9 Drawing Sheets

WIRELESS COMMUNICATION METHOD, COMMUNICATION DEVICE, AND STORAGE MEDIUM

CROSS-REFERENCE

The present application is a U.S. National Stage of International Application No. PCT/CN2020/100271, filed on Jul. 3, 2020, the contents of all of which are incorporated herein by reference in their entireties for all purposes.

BACKGROUND

In a new radio (NR) protocol for fifth generation mobile communication (5G), downlink data is carried on a physical downlink shared channel (PDSCH), and uplink data is carried on a physical uplink shared channel (PUSCH). For terminals having different capabilities, a base station may schedule one or more PDSCHs or PUSCHs in one time slot.

SUMMARY

The present disclosure relates to the technical field of wireless communications, but is not limited to the technical field of wireless communications, and in particular, to a wireless communication method and apparatus, a communication device, and a storage medium.

Disclosed in the embodiments of the present disclosure is a wireless communication method, applied to a terminal, the method including:
  reporting terminal capability information, where the terminal capability information is at least used for indicating a processing capability of the terminal at different subcarrier spacing (SCS).

According to a second aspect of the embodiments of the present disclosure, a wireless communication method is provided, applied to a base station, the method including:
  receiving terminal capability information reported by a terminal, where the terminal capability information is at least used for indicating a processing capability of the terminal at different subcarrier spacing (SCS).

According to a third aspect of the embodiments of the present disclosure, a wireless communication apparatus is provided, applied to a terminal, the apparatus including a reporting module, where
  the reporting module is configured to report terminal capability information, and the terminal capability information is at least used for indicating a processing capability of the terminal at different subcarrier spacing (SCS).

According to a fourth aspect of the embodiments of the present disclosure, a wireless communication apparatus is provided, applied to a base station, the apparatus including a second receiving module, where
  the second receiving module is configured to receive terminal capability information reported by a terminal, and the terminal capability information is at least used for indicating a processing capability of the terminal at different subcarrier spacing (SCS).

According to a fifth aspect of the embodiments of the present disclosure, a communication device is provided, including:
  a processor; and
  a memory for storing instructions executable by the processor,
  where the processor is configured to: when executing the executable instructions, implement the method in any embodiment of the present disclosure.

According to a sixth aspect of the embodiments of the present disclosure, a computer storage medium is provided, storing a computer executable program, where when the executable program is executed by a processor, the method in any embodiment of the present disclosure is implemented.

DETAILED DESCRIPTION

Exemplary embodiments will be described in detail here, and examples are shown in the accompanying drawings. When the following descriptions refer to the figures, the same numbers in different figures indicate the same or similar elements, unless otherwise indicated. Implementations described in the following examples do not represent all implementations consistent with the embodiments of the present disclosure. Instead, they are merely examples of apparatuses and methods consistent with some aspects of the embodiments of the present disclosure described as detailed in the appended claims.

The terms used in the embodiments of the present disclosure are merely for the purpose of describing specific embodiments, and are not intended to limit the embodiments of the present disclosure. The terms "a/an" and "the" in the singular form used in the embodiments of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms "first", "second", "third", etc. may be used in the embodiments of the present disclosure to describe various information, the information should not be limited to these terms. These terms are merely used to distinguish the same type of information from one another. For example, without departing from the scope of the embodiments of the present disclosure, the first information may also be referred to as second information, and similarly, the second information may also be referred to as first information. Depending on the context, the word "if" as used here may be interpreted as "when", "upon" or "in response to determining".

For the purposes of conciseness and ease of understanding, the term "greater than" or "less than" is used herein when characterizing a size relationship. However, for those skilled in the art, it can be understood that: the term "greater than" also encompasses the meaning of "greater than or equal to", and "less than" also encompasses the meaning of "less than or equal to".

Figure 1:
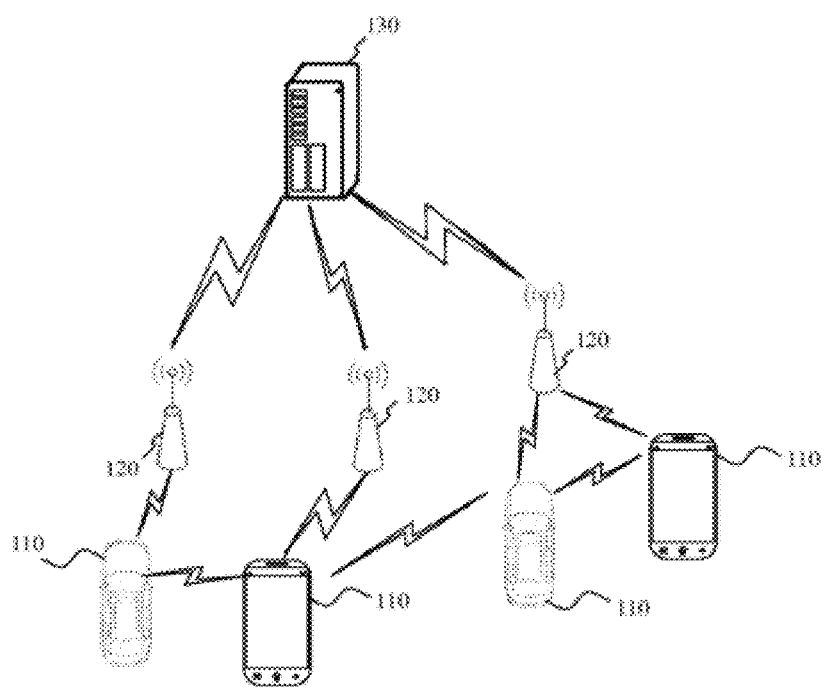
FIG. 1 is a schematic structural diagram of a wireless communication system.

Referring to FIG. 1, it shows a schematic structural diagram of a wireless communication system according to an embodiment of the present disclosure. As shown in FIG. 1, the wireless communication system is a communication system based on a cellular mobile communication technology and may include: a plurality of user equipment 110 and a plurality of base stations 120.

The user equipment 110 may refer to a device for providing voice and/or data connectivity for a user. The user equipment 110 may be in communication with one or more core networks via a radio access network (RAN), and the user equipment 110 may be an Internet of Things user equipment, such as a sensor device, a mobile phone (or "cellular" phone), and a computer having the Internet of Things user equipment, for example, may be a fixed, portable, pocket, handheld, computer built-in, or vehicle-mounted apparatus, for example, a station (STA), a subscriber unit, a subscriber station, a mobile station, a mobile, a remote station, an access point, a remote terminal, an access terminal, a user terminal, a user agent, a user device, or a user equipment. Or the user equipment 110 may also be an unmanned aerial vehicle device. Or the user equipment 110 may also be a vehicle-mounted device. For example, it may be a trip computer having a wireless communication function, or may be a wireless user equipment connected to the trip computer externally. Or the user equipment 110 may also be a roadside device. For example, may be a street lamp having the wireless communication function, a signal light, or other roadside devices.

The base station 120 may be a network side device in the wireless communication system. The wireless communication system may be the 4th generation mobile communication technology (4G) system, also referred to as a long term evolution (LTE) system; or, the wireless communication system may also be a 5G system, also referred to as a new radio system or a 5G NR system. Or the wireless communication system may also be a next generation system of the 5G system. An access network in the 5G system may be referred to as a new generation-radio access network (NG-RAN).

The base station 120 may be an evolved base station (eNB) used in the 4G system. Or the base station 120 may also be a base station using a centralized distribution architecture (gNB) in the 5G system. When the base station 120 uses the concentrated distribution architecture, a central unit (CU) and at least two distributed units (DU) are usually included. The central unit is provided with protocol stacks of a packet data convergence protocol (PDCP) stratum, a radio link control (RLC) protocol stratum, and a media access control (MAC) stratum; and the distributed unit is provided with a protocol stack of a physical (PHY) stratum, and the embodiments of the present disclosure do not limit the specific implementations of the base station 120.

Wireless connection between the base station 120 and the user equipment 110 may be established by means of a wireless air interface. In different implementations, the wireless air interface is a wireless air interface based on the fourth generation mobile communication network technology (4G) standard, or the wireless air interface is a wireless air interface based on the fifth generation mobile communication network technology (5G) standard, for example, the wireless air interface is a new radio; or the wireless air interface may also be a wireless air interface based on a further next generation mobile communication network technology standard of 5G.

In some embodiments, an end to end (E2E) connection may further be established between the user equipment 110, for example, scenarios such as vehicle to vehicle (V2V) communication, vehicle to infrastructure (V2I) communication, and vehicle to pedestrian (V2P) communication in vehicle to everything (V2X) communication.

The user equipment described above may be regarded as a terminal device of the following embodiments.

In some embodiments, the above wireless communication system further includes a network management device 130.

A plurality of base station 120 are connected with the network management device 130 respectively, where the network management device 130 may be a core network device of the wireless communication system. For example, the network management device 130 may be a mobility management entity (MME) in an evolved packet core network (EPC), or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 130.

In the embodiments of the present disclosure, terminal capability information is reported, where the terminal capability information is at least used for indicating a processing capability of the terminal at different subcarrier spacing (SCS). Since the terminal capability information indicates the processing capability of the terminal at different SCS, after receiving the terminal capability information, the base station can schedule resources based on the processing capability of the terminal at different SCS. Compared with a method of using the same scheduling parameter to schedule resources at different SCS, on the one hand, this method may reduce abnormal data processing caused by sufficient scheduled resources but an insufficient data processing capability of the terminal, which improves the reliability of data transmission; on the other hand, when performing resource scheduling, the base station may schedule resources to the terminal as many as possible based on the processing capability of the terminal, which reduces the times of scheduling and improves the efficiency of resource scheduling.

In order to facilitate understanding of any one of the embodiments of the present disclosure, a method for scheduling a channel is first described through an embodiment.

In an embodiment, a terminal reports a capability of the terminal to process a PDSCH or a PUSCH to a base station. For example, 1, 2, 4, or 7 PDSCHs or PUSCHs can be processed in one time slot.

In an embodiment, in a frequency below 52.6 GHz, optional SCS are 15 KHz, 30 KHz, 60 KHz, and 120 KHz, and one time slot includes 14 orthogonal frequency division multiplexing (OFDM) symbols (only 12 OFDM symbols in a case of an extended cyclic prefix (CP)). The duration of one time slot is 1 ms in a case where the SCS is 15 KHz; the duration is 0.5 ms in a case where the SCS is 30 KHz; and the duration is 0.25 ms in a case where the SCS is 60 KHz. It can be seen that the larger the SCS, the shorter the duration of one time slot.

In an embodiment, around a high frequency band of 60 GHz, a larger SCS is usually selected to cope with phase noise, for example, 960 KHz. In a case of 960 KHz, the duration of one time slot is 0.015625 ms, i.e., 1/64 ms.

In a high frequency communication system, the duration of one time slot is much less than 1 ms, for example, 0.015625 ms. A data processing capability of the terminal may not be able to handle a PDSCH or a PUSCH in each time slot.

Figure 2:
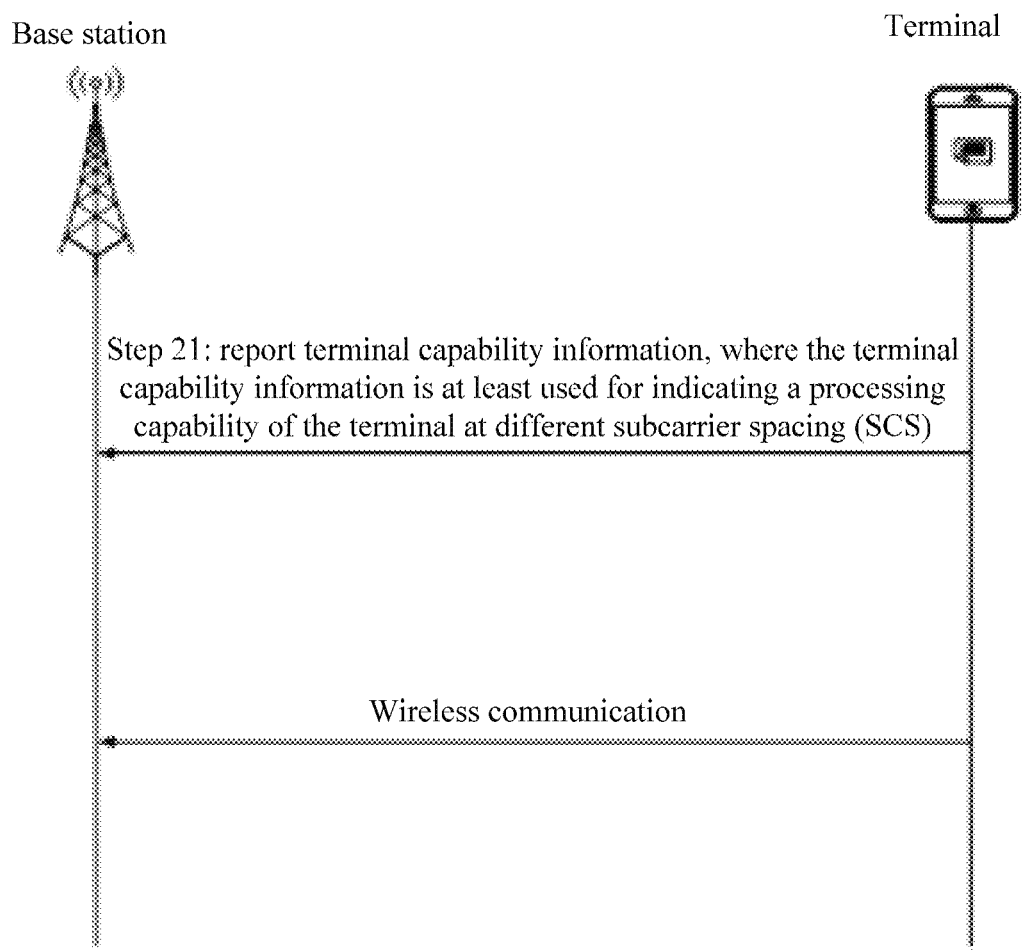
FIG. 2 is a flowchart of a wireless communication device according to an example.

As shown in FIG. 2, the present embodiment provides a wireless communication device, applied to a terminal, the method including:

Step 21: reporting terminal capability information, where the terminal capability information is at least used for indicating a processing capability of the terminal at different subcarrier spacing (SCS).

In an embodiment, the processing capability may be a capability of the terminal to process data or support processing a channel. For example, when the processing capability is the capability of the terminal to process data, the processing capability may be an encoding and/or decoding capability of the terminal, or may be a modulation and/or demodulation capability of the terminal. When the processing capability is the capability of the terminal to support processing a channel, the processing capability may be a capability of the terminal to support processing how many PDSCHs or PUSCHs. The terminal is limited by software and hardware configuration of the terminal, and different types of terminals may have different processing capabilities.

The terminal may be, but is not limited to, a cell phone, a wearable device, a vehicle-mounted terminal, a road side unit (RSU), a smart home terminal, an industrial-use sensing device, and/or a medical device, etc.

The terminal may report the terminal capability information to a base station. The base station may be an interface device for the terminal to access a network. The base station may be various types of base stations, for example, a base station of a third generation mobile communication (3G) network, a base station of a fourth generation mobile communication (4G) network, a base station of a fifth generation mobile communication (5G) network, or other evolved base stations.

In an embodiment, the terminal capability information is reported in response to the terminal establishing a radio resource control (RRC) connection with the base station. Thus, the base station can timely obtain the terminal capability information and perform resource scheduling based on the terminal capability information.

In an embodiment, the terminal capability information may be sent to the base station in response to receiving an acquisition request sent by the base station to acquire the terminal capability information. The acquisition request may include content of the information to be acquired. For example, there is a need to acquire information about the capability of the terminal to process a PDSCH or a PUSCH.

In an embodiment, the terminal may periodically send the terminal capability information to the base station until feedback information sent by the base station for the terminal capability information is received. Thus, it may be reduced that the base station cannot receive the terminal capability information due to a network anomaly, which improves the reliability of data transmission.

In an embodiment, the terminal capability information may be carried using RRC signaling and reported to the base station. Thus, the terminal capability information can be sent using existing RRC signaling, which improves the compatibility of the RRC signaling.

In an embodiment, the terminal stores the terminal capability information. The terminal capability information may be configured and stored in the terminal in factory settings. A storage manner and a storage location of the terminal capability information may be determined according to a preset rule. For example, the terminal capability information is stored in an A storage region to facilitate the acquisition.

In an embodiment, the terminal capability information carries an identity document (ID) of the terminal. The identity document of the terminal is used for uniquely identifying a terminal. Identification information of the terminal may be a subscriber identity module (SIM) number of a SIM included in the terminal. Thus, after receiving the terminal capability information, the base station may determine the terminal corresponding to the terminal capability information based on the identity document of the terminal carried in the terminal capability information.

In an embodiment, the optional SCS of the terminal are 240 KHz, 480 KHz, 960 KHz, and 1920 KHz. In an embodiment, when the SCS is 240 KHz, the duration of one time slot is 0.0625 ms, and the terminal can process a PDSCHs or PUSCHs in N time slots; when the SCS is 480 KHz, the duration of one time slot is 0.03125 ms, and the terminal can process b PDSCHs or PUSCHs in N time slots; when the SCS is 960 KHz, the duration of one time slot is 0.015625 ms, and the terminal can process c PDSCHs or PUSCHs in N time slots; and when the SCS is 1920 KHz, the duration of one time slot is 0.0078125 ms, and the terminal can process d PDSCHs or PUSCHs in N time slots. A, b, c, and d may be or not be equal, where N, a, b, c, and d are positive integers. N is a positive integer greater than 1.

In an embodiment, around a high frequency band of 60 GHz, a larger SCS is usually selected to reduce phase noise, for example, 960 KHz. In a case of 960 KHz, the duration of one time slot is 0.015625 ms, i.e., 1/64 ms. Since one time slot lasts too short, the terminal may need a plurality of time slots to be able to process one PDSCH or PUSCH.

In an embodiment, referring to Table 1, in the terminal capability information, different information fields are set for different SCS. Each information field is used for carrying the terminal capability information of the terminal at a corresponding SCS, for example, information about the number of PDSCHs or PUSCHs processed in N time slots. Each SCS may be represented by an SCS identity. In Table 1, "001" indicates an SCS of 240 KHz; "010" indicates an SCS of 480 KHz; "011" indicates an SCS of 960 KHz; and "100" indicates an SCS of 1920 KHz.

TABLE 1

| Subcarrier spacing (SCS) identity | The number of physical downlink shared channels (PDSCH) or physical uplink shared channels (PUSCH) processed in N time slots. |
|---|---|
| 001 | a |
| 010 | b |
| 011 | c |
| 100 | d |

In the present embodiment, since the terminal capability information indicates the processing capability of the terminal at different SCS, after receiving the terminal capability information, the base station can schedule resources based on the processing capability of the terminal at different SCS. Compared with a method of using the same processing parameter to schedule resources at different SCS, on the one hand, this method may reduce abnormal data processing caused by sufficient scheduled resources but an insufficient data processing capability of the terminal, which improves the reliability of data transmission; on the other hand, when resource processing is performed, the base station may schedule resources to the terminal as many as possible based on the processing capability of the terminal, which reduces the times of scheduling and improves the efficiency of resource scheduling.

In an embodiment, the terminal capability information is used for indicating a capability, supported at different SCS, of the terminal to process a PDSCH and/or a PUSCH.

In an embodiment, the terminal capability information simultaneously carries information indicating a capability, supported at different SCS, of the terminal to process a PDSCH and/or a PUSCH. For example, at a first SCS, the terminal supports processing 7 PDSCHs in 1 ms or N time slots. At a second SCS, the terminal supports processing 4 PDSCHs in 1 ms or N time slots. Then the terminal capability information simultaneously indicates capabilities, supported at the first SCS and the second SCS, of processing a PDSCH and a PUSCH. N is a positive integer greater than 1.

In an embodiment, the processing capability information includes at least one of:
a number of time slots that are needed for the terminal supports processing one PDSCH at different SCS;
a number of time slots that are needed for the terminal supports processing one PUSCH at different SCS;
a time interval between two adjacent transmissions that is supported by the terminal at different SCS;
a number of PDSCHs that the terminal supports processing in a unit duration at different SCS;
a number of PUSCHs that the terminal supports processing in a unit duration at different SCS; or
a total number of PDSCHs and PUSCHs that the terminal supports processing in a unit duration at different SCS.

In an embodiment, the number of time slots may be a range, for example, 5 to 6, and for another example, greater than 3.

In some embodiments, the two adjacent transmissions supported by the terminal can be, for example, two adjacent PUSCH sends, or two adjacent PDSCH receptions, or one PDSCH reception and one adjacent PDSCH send.

In an embodiment, one PDSCH and/or one PUSCH may be processed every M time slots. For example, when the SCS=960 KHz, M=4; and when the SCS=480 KHz, M=2. M is a positive integer greater than or equal to 1. The terminal capability information includes information of the number M.

In an embodiment, the terminal capability information includes the number of time slots that are needed for processing one physical downlink shared channel (PDSCH) and supported by the terminal at different SCS. For example, when the SCS is 240 KHz, the number of time slots needed by the terminal to process one PDSCH is N1; when the SCS is 480 KHz, the number of time slots for the terminal to process one PDSCH is N2; when the SCS is 960 KHz, the number of time slots for the terminal to process one PDSCH is N3; and when the SCS is 1920 KHz, the number of time slots for the terminal to process one PDSCH is N4. N1, N2, N3, and N4 may be or not be equal, where N1, N2, N3, and N4 are positive integers. The terminal capability information includes number information N1, N2, N3, and N4.

In an embodiment, the terminal capability information includes the number of time slots that are needed for processing one physical uplink shared channel (PUSCH) and supported by the terminal at different SCS. For example, when the SCS is 240 KHz, the number of time slots needed by the terminal to process one PUSCH is T1; when the SCS is 480 KHz, the number of time slots for the terminal to process one PUSCH is T2; when the SCS is 960 KHz, the number of time slots for the terminal to process one PUSCH is T3; and when the SCS is 1920 KHz, the number of time slots for the terminal to process one PUSCH is T4. T1, T2, T3, and T4 may be or not be equal, where T1, T2, T3, and T4 are positive integers. The terminal capability information includes number information T1, T2, T3, and T4.

In an embodiment, the time interval between two adjacent transmissions may be a time length or a time slot between two adjacent data transmissions. For example, the time interval between two adjacent transmissions is 1 ms. For another example, the time interval between two adjacent transmissions is 4 time slots.

In an embodiment, the time interval may be a range. For example, the time interval may include 4 to 5 time slots. For another example, the time interval includes more than 4 time slots.

In an embodiment, the time interval is:
a time interval between processing two adjacent PDSCHs; or
a time interval between processing two adjacent PUSCHs; or
a time interval between processing the PDSCH and the PUSCH adjacent to the PDSCH.

In an embodiment, when the subcarrier spacing=960 KHz, the time interval=4 time slots; and when the subcarrier spacing=480 KHz, the time interval=2 time slots.

In an embodiment, when the SCS=960 KHz, the time interval between processing two adjacent PDSCHs=3 time slots, the time interval between processing two adjacent PUSCHs=4 time slots, and the time interval between processing the PDSCH and the PUSCH adjacent to the PDSCH=2 time slots.

Setting the time interval may reserve time for data processing of the terminal, which improves the reliability of data transmission. In an embodiment, the longer the time interval, the longer a reserved time, and then the terminal has a longer time to process data that needs to be transmitted in this time period, to ensure that the data can be completely transmitted.

In an embodiment, the number of PDSCHs or PUSCHs that the terminal supports processing in a unit duration at different SCS may be a range. For example, the number is 4 to 5. For another example, the number is greater than 4.

In an embodiment, the terminal capability information includes the number of PDSCHs that the terminal supports processing in a unit duration at different SCS. For example, when the SCS is 240 KHz, the terminal supports processing X1 PDSCHs in 1 ms; when the SCS is 480 KHz, the terminal supports processing X2 PDSCHs in 1 ms; when the SCS is 960 KHz, the terminal supports processing X3 PDSCHs in 1 ms; and when the SCS is 1920 KHz, the terminal supports processing X4 PDSCHs in 1 ms. X1, X2, X3, and X4 may be or not be equal, where X1, X2, X3, and X4 are positive integers. The terminal capability information includes number information X1, X2, X3, and X4.

In an embodiment, the terminal capability information includes the number of PUSCHs that the terminal supports processing in a unit duration at different SCS. For example, when the SCS is 240 KHz, the terminal supports processing Y1 PUSCHs in 1 ms; when the SCS is 480 KHz, the terminal supports processing Y2 PUSCHs in 1 ms; when the SCS is 960 KHz, the terminal supports processing Y3 PUSCHs in 1 ms; and when the SCS is 1920 KHz, the terminal supports processing Y4 PUSCHs in 1 ms. Y1, Y2, Y3, and Y4 may be or not be equal, where Y1, Y2, Y3, and Y4 are positive integers. The terminal capability information includes number information Y1, Y2, Y3, and Y4.

In an embodiment, the terminal capability information includes the number of PDSCHs and PUSCHs that the terminal supports processing in a unit duration at different SCS. For example, when the SCS is 240 KHz, the terminal supports processing X1 PDSCHs and Y1 PUSCHs in 1 ms; when the SCS is 480 KHz, the terminal supports processing X2 PDSCHs and Y2 PUSCHs in 1 ms; when the SCS is 960 KHz, the terminal supports processing X3 PDSCHs and Y3 PUSCHs in 1 ms; and when the SCS is 1920 KHz, the terminal supports processing X4 PDSCHs and Y4 PUSCHs in 1 ms. X1, X2, X3, X4, Y1, Y2, Y3, and Y4 are positive integers. The terminal capability information includes number information X1, X2, X3, X4, Y1, Y2, Y3, and Y4.

In an embodiment, when the SCS=960 KHz, the total number of PDSCHs processed in 1 ms (i.e, 64 time slots) may be specified not to exceed 10; and when the SCS=480 KHz, the total number of PDSCHs processed in 1 ms (i.e, 32 time slots) may be specified not to exceed 7.

In an embodiment, the processing capability information includes at least one of:
 a minimum number of time slots that are needed for the terminal supports processing one PDSCH at different SCS;
 a minimum number of time slots that are needed for the terminal supports processing one PUSCH at different SCS;
 a minimum time interval between two adjacent transmissions that is supported by the terminal at different SCS;
 a maximum number of PDSCHs that the terminal supports processing in a unit duration at different SCS;
 a maximum number of PUSCHs that the terminal supports processing in a unit duration at different SCS; or
 a maximum total number of PDSCHs and PUSCHs that the terminal supports processing in a unit duration at different SCS.

Figure 3:
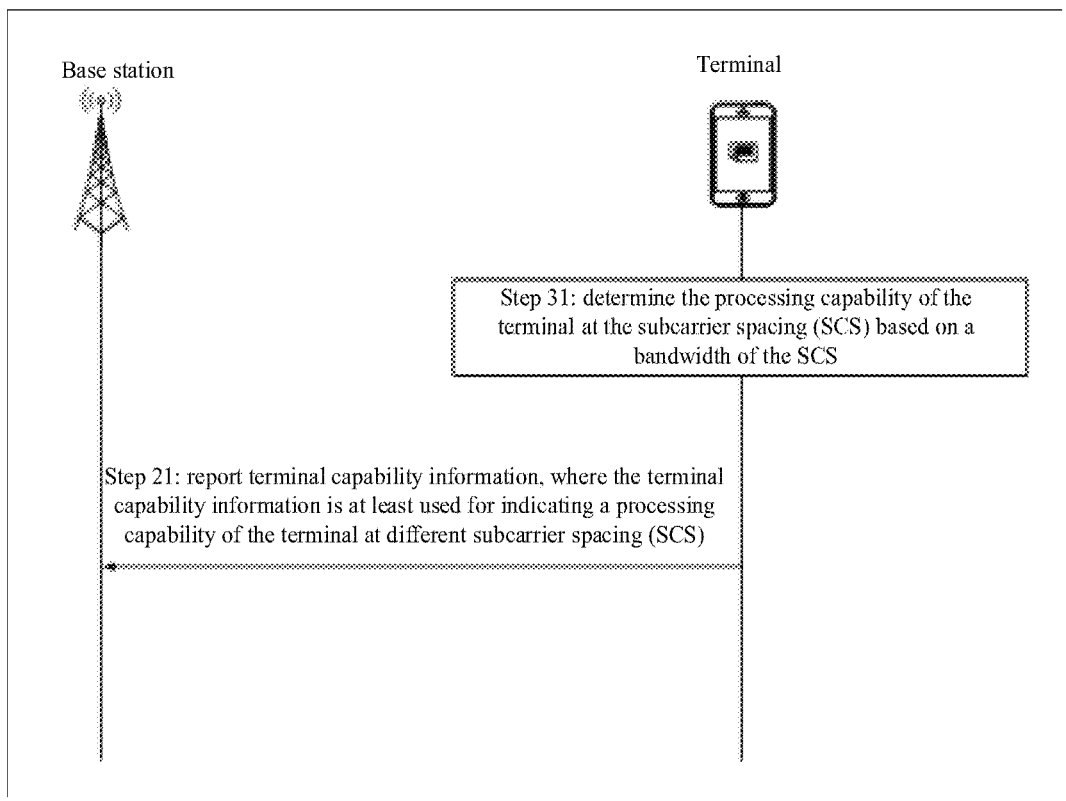
FIG. 3 is a flowchart of a wireless communication device according to an example.

Processing is as shown in FIG. 3. The present embodiment provides a wireless communication method, where the method further includes:

Step 31: determining the processing capability of the terminal at the SCS subcarrier spacing based on a bandwidth of the SCS.

In an embodiment, optional SCS of the terminal are 240 KHz, 480 KHz, 960 KHz, and 1920 KHz. In an embodiment, when the SCS is 240 KHz, it is determined that the terminal can process C1 PDSCHs or PUSCHs in N time slots; when the SCS is 480 KHz, it is determined that the terminal can process C2 PDSCHs or PUSCHs in N time slots; when the SCS is 960 KHz, it is determined that the terminal can process C3 PDSCHs or PUSCHs in N time slots; and when the SCS is 1920 KHz, it is determined that the terminal can process C4 PDSCHs or PUSCHs in N time slots. C1, C2, C3, and C4 may be or not be equal, where N, C1, C2, C3, and C4 are positive integers. N is a positive integer greater than 1. The terminal capability information includes number information N, C1, C2, C3, and C4.

Time lengths of time slots corresponding to different SCS are different, and determining, based on the SCS, the number of PDSCHs or PUSCHs processed by the terminal in one time slot can more accurately reflect the capability of the terminal to process channels.

Figure 4:
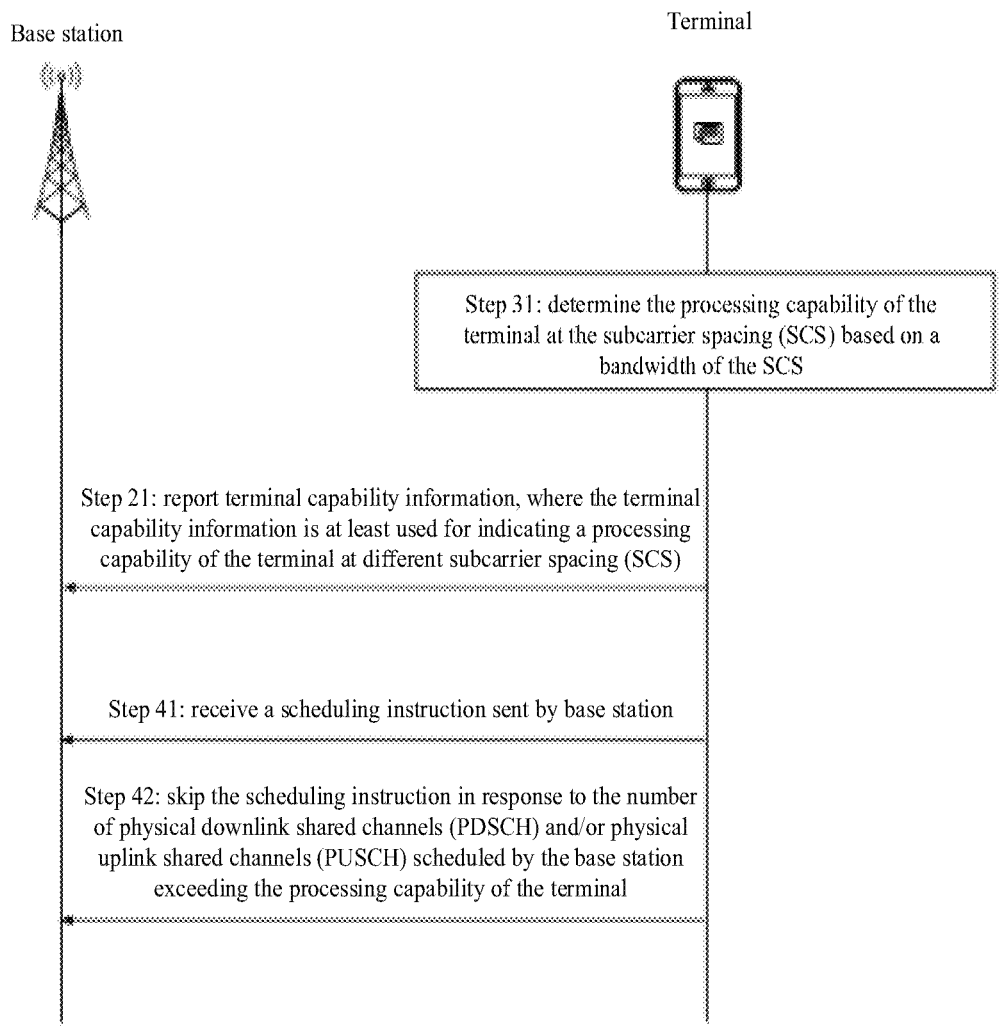
FIG. 4 is a flowchart of a wireless communication device according to an example.

As shown in FIG. 4, the present embodiment provides a wireless communication device, where the method further includes:

Step 41: receiving a scheduling instruction sent by base station; and

Step 42: skipping the scheduling instruction in response to the number of the PDSCHs and/or PUSCHs scheduled by the base station exceeding the processing capability of the terminal.

In an embodiment, the terminal receives a downlink control indicator (DCI) sent by the base station and parses out the scheduling instruction. When it is determined that the number of accumulated PDSCHs scheduled by the base station in 1 ms exceeds the processing capability of the terminal, the scheduling instruction is skipped.

In an embodiment, the terminal capability indication information reported by the terminal to the base station indicates that the terminal can process up to 10 PDSCHs in 64 time slots when the SCS=960 KHz. If the base station has instructed the terminal to process 10 PDSCHs within the 0th time slot to the 63rd time slot, and then instructs the terminal to process the 11th PDSCH, after receiving the 11th scheduling instruction, the terminal will skip the scheduling instruction of the 11th PDSCH. Thus, it may be reduced that the terminal processes a channel beyond the processing capability of the terminal, and the reliability of processing data may be improved.

Figure 5:
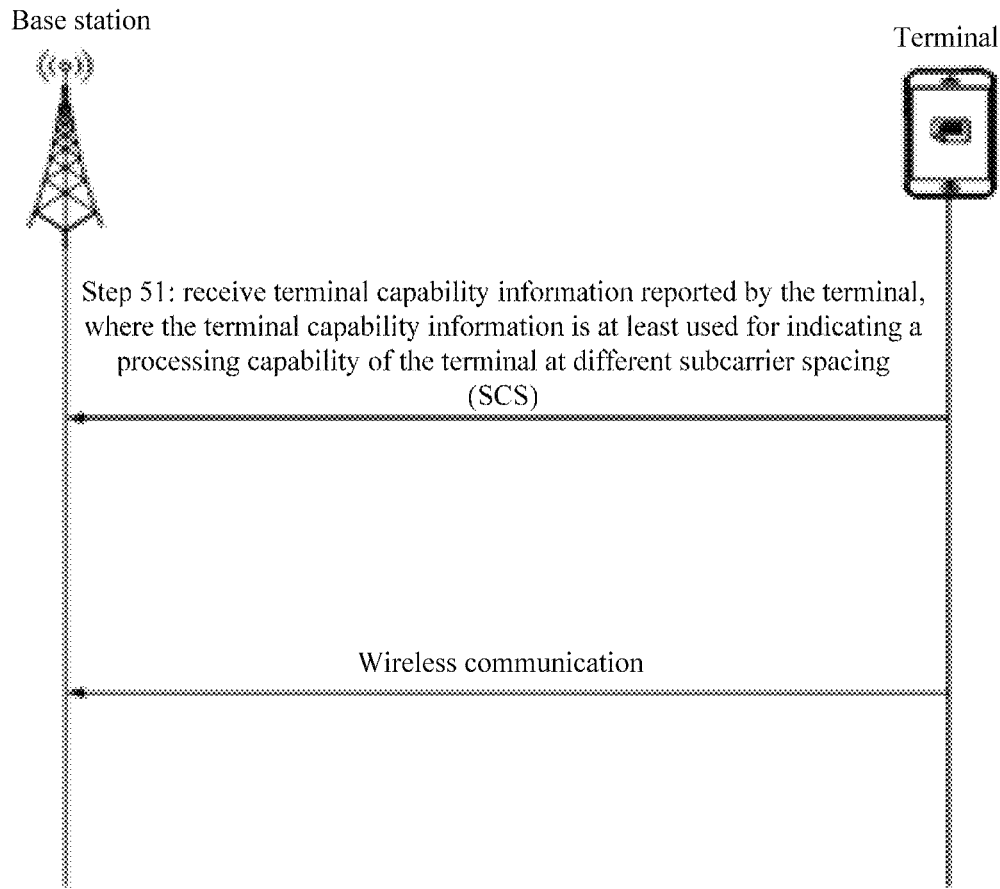
FIG. 5 is a flowchart of a wireless communication device according to an example.

As shown in FIG. 5, the present embodiment provides a wireless communication device, applied to a base station, the method including:

Step 51: receiving terminal capability information reported by a terminal, where the terminal capability information is at least used for indicating a processing capability of the terminal at different subcarrier spacing (SCS).

In an embodiment, the processing capability may be a capability of the terminal to process data or support processing a channel. For example, when the processing capability is the capability of the terminal to process data, the processing capability may be an encoding and/or decoding capability of the terminal, or may be a modulation and/or demodulation capability of the terminal. When the processing capability is the capability of the terminal to support processing a channel, the processing capability may be a capability of the terminal to support processing how many PDSCHs or PUSCHs. The terminal is limited by software and hardware configuration of the terminal, and different types of terminals may have different processing capabilities.

The terminal may be, but is not limited to, a cell phone, a wearable device, a vehicle-mounted terminal, a road side unit (RSU), a smart home terminal, an industrial-use sensing device, and/or a medical device, etc.

The base station may be an interface device for the terminal to access a network. The base station may be various types of base stations, for example, a base station of a third generation mobile communication (3G) network, a base station of a fourth generation mobile communication (4G) network, a base station of a fifth generation mobile communication (5G) network, or other evolved base stations.

In an embodiment, the terminal capability information sent by the terminal and reported in response to the terminal establishing a radio resource control (RRC) connection with the base station is received. Thus, the base station can timely obtain the terminal capability information and perform resource scheduling based on the terminal capability information.

In an embodiment, the terminal capability information sent to the base station by the terminal in response to receiving an acquisition request sent by the base station to acquire the terminal capability information may be received. The acquisition request may include the content of the information to be acquired. For example, there is a need to acquire information about the capability of the terminal to process a PDSCH or a PUSCH.

In an embodiment, the terminal may periodically send the terminal capability information to the base station until feedback information sent by the base station for the terminal capability information is received. Thus, it may be reduced that the base station cannot receive the terminal capability information due to a network anomaly, which improves the reliability of data transmission.

In an embodiment, RRC signaling carrying the terminal capability information sent by the terminal may be received. Thus, the terminal capability information can be sent using existing RRC signaling, which improves the compatibility of the RRC signaling.

In an embodiment, the terminal capability information carries an identity document (ID) of the terminal. The identity document of the terminal is used for uniquely identifying a terminal. Identification information of the terminal may be a subscriber identity module (SIM) number of a SIM included in the terminal. Thus, after receiving the terminal capability information, the base station may determine the terminal corresponding to the terminal capability information based on the identity document of the terminal carried in the terminal capability information.

In an embodiment, the optional SCS of the terminal are 240 KHz, 480 KHz, 960 KHz, and 1920 KHz. In an embodiment, when the SCS is 240 KHz, the duration of one time slot is 0.0625 ms, and the terminal can process a PDSCHs or PUSCHs in N time slots; when the SCS is 480 KHz, the duration of one time slot is 0.03125 ms, and the terminal can process b PDSCHs or PUSCHs in N time slots; when the SCS is 960 KHz, the duration of one time slot is 0.015625 ms, and the terminal can process c PDSCHs or PUSCHs in N time slots; and when the SCS is 1920 KHz, the duration of one time slot is 0.0078125 ms, and the terminal can process d PDSCHs or PUSCHs in N time slots. A, b, c, and d may be or not be equal, where N, a, b, c, and d are positive integers. N is a positive integer greater than 1.

In an embodiment, around a high frequency band of 60 GHz, a larger SCS is usually selected to reduce phase noise, for example, 960 KHz. In a case of 960 KHz, the duration of one time slot is 0.015625 ms, i.e., 1/64 ms. Since one time slot lasts too short, the terminal may need a plurality of time slots to be able to process one PDSCH or PUSCH.

In an embodiment, referring to Table 1, in the terminal capability information, different information fields are set for different SCS. Each information field is used for carrying the terminal capability information of the terminal at a corresponding SCS, for example, information about the number of time slots for processing PDSCHs or PUSCHs. Each SCS may be represented by an SCS identity. In Table 1, "001" indicates an SCS of 240 KHz; "010" indicates an SCS of 480 KHz; "011" indicates an SCS of 960 KHz; and "100" indicates an SCS of 1920 KHz.

In the present embodiment, since the terminal capability information indicates the processing capability of the terminal at different SCS, after receiving the terminal capability information, the base station can schedule resources based on the processing capability of the terminal at different SCS. Compared with a method of using the same scheduling parameter to schedule resources at different SCS, on the one hand, this method may reduce abnormal data processing caused by sufficient scheduled resources but an insufficient data processing capability of the terminal, which improves the reliability of data transmission; on the other hand, when resource scheduling is performed, the base station may schedule resources to the terminal as many as possible based on the capability of the terminal, which reduces the times of scheduling and improves the efficiency of resource scheduling.

In an embodiment, the terminal capability information is used for indicating a capability, supported at different SCS, of the terminal to process a PDSCH and/or a PUSCH.

In an embodiment, the terminal capability information simultaneously carries information indicating a capability, supported at different SCS, of the terminal to process a PDSCH and/or a PUSCH. For example, at a first SCS, the terminal supports processing 7 PDSCHs in 1 ms or N time slots. At a second SCS, the terminal supports processing 4 PDSCHs in 1 ms or N time slots. Then the terminal capability information simultaneously indicates capabilities, supported at the first SCS and the second SCS, of processing a PDSCH and a PUSCH. N is a positive integer greater than 1.

In an embodiment, the processing capability information includes at least one of:
- a number of time slots that are needed for the terminal supports processing one PDSCH at different SCS;
- a number of time slots that are needed for the terminal supports processing one PUSCH at different SCS;
- a time interval between two adjacent transmissions that is supported by the terminal at different SCS;
- a number of PDSCHs that the terminal supports processing in a unit duration at different SCS;
- a number of PUSCHs that the terminal supports processing in a unit duration at different SCS; or
- a total number of PDSCHs and PUSCHs that the terminal supports processing in a unit duration at different SCS.

In an embodiment, the number of time slots may be a range, for example, 5 to 6, and for another example, greater than 3.

In some embodiments, the two adjacent transmissions supported by the terminal can be, for example, two adjacent PUSCH sends, or two adjacent PDSCH receptions, or one PDSCH reception and one adjacent PDSCH send.

In an embodiment, one PDSCH and/or PUSCH may be processed every M time slots. For example, when the SCS=960 KHz, M=4; and when the SCS=480 KHz, M=2. M is a positive integer greater than or equal to 1. The terminal capability information includes information of the number M.

In an embodiment, the terminal capability information includes the number of time slots that are needed for processing one physical downlink shared control channel (PDSCH) and supported by the terminal at different SCS. For example, when the SCS is 240 KHz, the number of time slots needed by the terminal to process one PDSCH is N1; when the SCS is 480 KHz, the number of time slots for the terminal to process one PDSCH is N2; when the SCS is 960 KHz, the number of time slots for the terminal to process one PDSCH is N3; and when the SCS is 1920 KHz, the number of time slots for the terminal to process one PDSCH is N4. N1, N2, N3, and N4 may be or not be equal, where N1, N2, N3, and N4 are positive integers. The terminal capability information includes number information N1, N2, N3, and N4.

In an embodiment, the terminal capability information includes the number of time slots that are needed for processing one physical uplink shared control channel (PUSCH) and supported by the terminal at different SCS. For example, when the SCS is 240 KHz, the number of time slots needed by the terminal to process one PUSCH is T1; when the SCS is 480 KHz, the number of time slots for the terminal to process one PUSCH is T2; when the SCS is 960 KHz, the number of time slots for the terminal to process one PUSCH is T3; and when the SCS is 1920 KHz, the number of time slots for the terminal to process one PUSCH is T4. T1, T2, T3, and T4 may be or not be equal, where T1, T2, T3, and T4 are positive integers. The terminal capability information includes number information T1, T2, T3, and T4.

In an embodiment, the time interval between two adjacent transmissions may be a time length or a time slot between two adjacent data transmissions. For example, the time interval between two adjacent transmissions is 1 ms. For another example, the time interval between two adjacent transmissions is 4 time slots.

In an embodiment, the time interval may be a range. For example, the time interval may include 4 to 5 time slots. For another example, the time interval includes more than 4 time slots.

In an embodiment, the time interval is:
a time interval between processing two adjacent PDSCHs; or
a time interval between processing two adjacent PUSCHs; or
a time interval between processing the PDSCH and the PUSCH adjacent to the PDSCH.

In an embodiment, when the subcarrier spacing=960 KHz, the time interval=4 time slots; and when the subcarrier spacing=480 KHz, the time interval=2 time slots.

In an embodiment, when the SCS=960 KHz, the time interval between processing two adjacent PDSCHs=3 time slots, the time interval between processing two adjacent PUSCHs=4 time slots, and the time interval between processing the PDSCH and the PUSCH adjacent to the PDSCH=2 time slots.

Setting the time interval may reserve time for data processing of the terminal, which improves the reliability of data transmission. In an embodiment, the longer the time interval, the longer a reserved time, and then the terminal has a longer time to process data that needs to be transmitted in this time period, to ensure that the data can be completely transmitted.

In an embodiment, the number of PDSCHs or PUSCHs that the terminal supports processing in a unit duration at different SCS may be a range. For example, the number is 3 to 4. For another example, the number is greater than 3.

In an embodiment, the terminal capability information includes the number of PDSCHs that the terminal supports processing in a unit duration at different SCS. For example, when the SCS is 240 KHz, the terminal supports processing X1 PDSCHs in 1 ms; when the SCS is 480 KHz, the terminal supports processing X2 PDSCHs in 1 ms; when the SCS is 960 KHz, the terminal supports processing X3 PDSCHs in 1 ms; and when the SCS is 1920 KHz, the terminal supports processing X4 PDSCHs in 1 ms. X1, X2, X3, and X4 may be or not be equal, where X1, X2, X3, and X4 are positive integers. The terminal capability information includes number information X1, X2, X3, and X4.

In an embodiment, the terminal capability information includes the number of PUSCHs that the terminal supports processing in a unit duration at different SCS. For example, when the SCS is 240 KHz, the terminal supports processing Y1 PUSCHs in 1 ms; when the SCS is 480 KHz, the terminal supports processing Y2 PUSCHs in 1 ms; when the SCS is 960 KHz, the terminal supports processing Y3 PUSCHs in 1 ms; and when the SCS is 1920 KHz, the terminal supports processing Y4 PUSCHs in 1 ms. Y1, Y2, Y3, and Y4 may be or not be equal, where Y1, Y2, Y3, and Y4 are positive integers. The terminal capability information includes number information Y1, Y2, Y3, and Y4.

In an embodiment, the terminal capability information includes the number of PDSCHs and PUSCHs that the terminal supports processing in a unit duration at different SCS. For example, when the SCS is 240 KHz, the terminal supports processing X1 PDSCHs and Y1 PUSCHs in 1 ms; when the SCS is 480 KHz, the terminal supports processing X2 PDSCHs and Y2 PUSCHs in 1 ms; when the SCS is 960 KHz, the terminal supports processing X3 PDSCHs and Y3 PUSCHs in 1 ms; and when the SCS is 1920 KHz, the terminal supports processing X4 PDSCHs and Y4 PUSCHs in 1 ms. X1, X2, X3, X4, Y1, Y2, Y3, and Y4 are positive integers. The terminal capability information includes number information X1, X2, X3, X4, Y1, Y2, Y3, and Y4.

In an embodiment, when the SCS=960 KHz, the total number of PDSCHs processed in 1 ms (i.e., 64 time slots) may be specified not to exceed 10; and when the SCS=480 KHz, the total number of PDSCHs or PUSCHs processed in 1 ms (i.e, 32 time slots) may be specified not to exceed 7.

In an embodiment, the processing capability information includes at least one of:
a minimum number of time slots that are needed for the terminal supports processing one PDSCH at different SCS;
a minimum number of time slots that are needed for the terminal supports processing one PUSCH at different SCS;
a minimum time interval between two adjacent transmissions that is supported by the terminal at different SCS;
a maximum number of PDSCHs that the terminal supports processing in a unit duration at different SCS;
a maximum number of PUSCHs that the terminal supports processing in a unit duration at different SCS; or
a maximum total number of PDSCHs and PUSCHs that the terminal supports processing in a unit duration at different SCS.

In an embodiment, the processing capability of the terminal at the SCS is determined based on a bandwidth of the SCS.

In an embodiment, the optional SCS of the terminal are 240 KHz, 480 KHz, 960 KHz, and 1920 KHz. In an embodiment, when the SCS is 240 KHz, it is determined that the terminal can process C1 PDSCHs or PUSCHs in N time slots; when the SCS is 480 KHz, it is determined that the terminal can process C2 PDSCHs or PUSCHs in N time slots; when the SCS is 960 KHz, it is determined that the terminal can process C3 PDSCHs or PUSCHs in N time slots; and when the SCS is 1920 KHz, it is determined that the terminal can process C4 PDSCHs or PUSCHs in N time slots. C1, C2, C3, and C4 may be or not be equal, where N, C1, C2, C3, and C4 are positive integers. The terminal capability information includes number information N, C1, C2, C3, and C4. N is a positive integer greater than 1.

Time lengths of time slots corresponding to different SCS are different, and determining, based on the SCS, the number of PDSCHs or PUSCHs processed by the terminal in N time slots can more accurately reflect the capability of the terminal to process channels.

Figure 6:
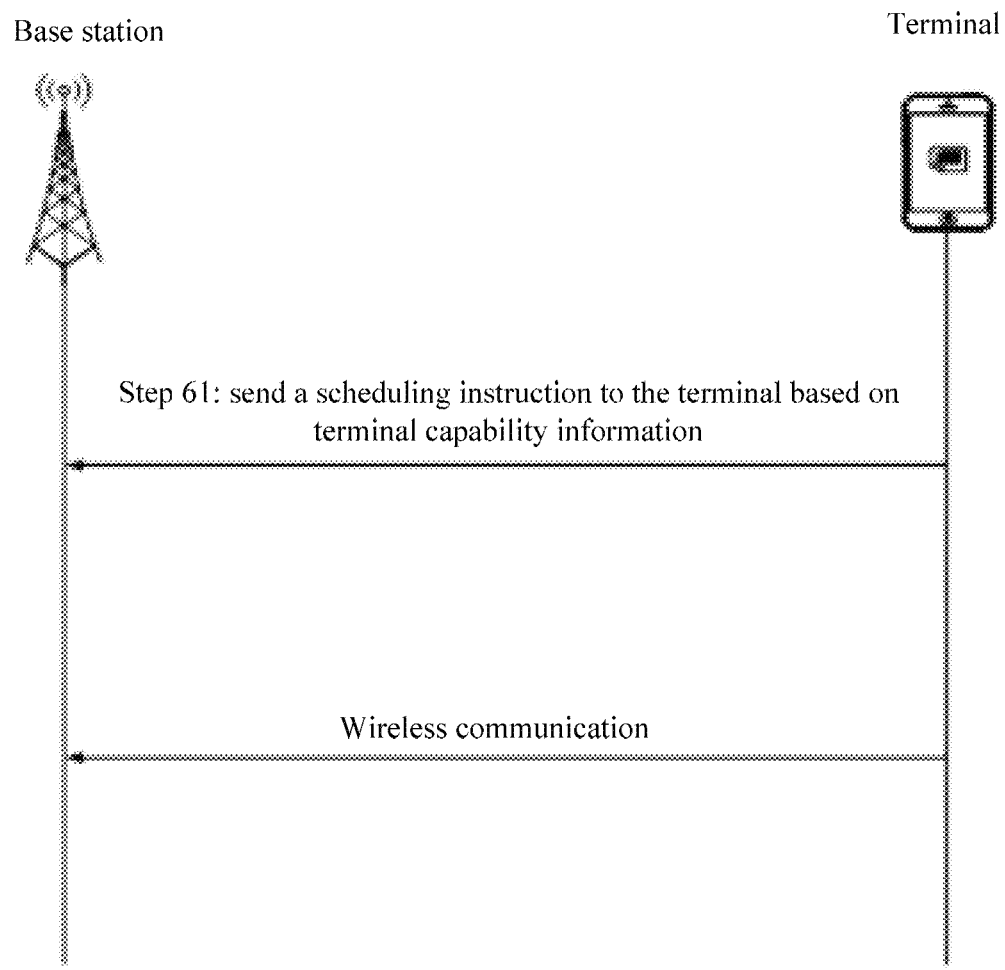
FIG. 6 is a flowchart of a wireless communication device according to an example.

As shown in FIG. 6, the present embodiment provides a wireless communication device, where the method further includes:

Step 61: sending a scheduling instruction to the terminal based on the terminal capability information.

In an embodiment, the optional SCS of the terminal are 240 KHz, 480 KHz, 960 KHz, and 1920 KHz. In an embodiment, the terminal capability information indicates that: when the SCS is 240 KHz, the terminal can process D1 PDSCHs in N time slots; when the SCS is 480 KHz, the terminal can process D2 PDSCHs in N time slots; when the SCS is 960 KHz, the terminal can process D3 PDSCHs in N time slots; and when the SCS is 1920 KHz, the terminal can process D4 PDSCHs in N time slots. Then when the SCS is 240 KHz, in N time slots, the base station sends scheduling instructions for processing D1 PDSCHs to the terminal at most; when the SCS is 240 KHz, in N time slots, the base station sends scheduling instructions for processing D2 PDSCHs to the terminal at most; when the SCS is 960 KHz, in N time slots, the base station sends scheduling instructions of processing D3 PDSCHs to the terminal at most; and when the SCS is 1920 KHz, in N time slots, the base station sends scheduling instructions of processing D4 PDSCHs to the terminal at most. D1, D2, D3, and D4 may be or not be equal, where N, D1, D2, D3, and D4 are positive integers. N is a positive integer greater than 1.

Figure 7:
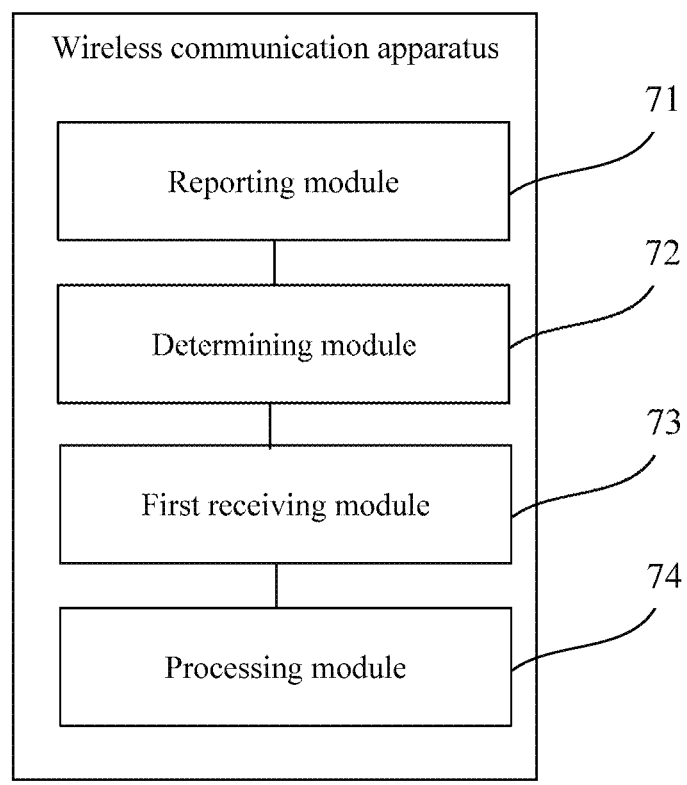
FIG. 7 is a schematic diagram of a wireless communication device according to an example.

As shown in FIG. 7, the present embodiment provides a wireless communication device, applied to a terminal, and the apparatus includes a reporting module 71, where the reporting module 71 is configured to report terminal capability information, and the terminal capability information is at least used for indicating a processing capability of the terminal at different subcarrier spacing (SCS).

In an embodiment, the apparatus further includes a determining module 72, where the determining module 72 is configured to: determine the processing capability of the terminal at the SCS subcarrier spacing based on a bandwidth of the SCS.

In an embodiment, the apparatus further includes a first receiving module 73 and a processing module 74, where the first receiving module 73 is configured to receive a scheduling instruction sent by base station; and the processing module 74 is configured to: skip the scheduling instruction in response to the number of the PDSCHs and/or PUSCHs scheduled by the base station exceeding the processing capability of the terminal.

Figure 8:
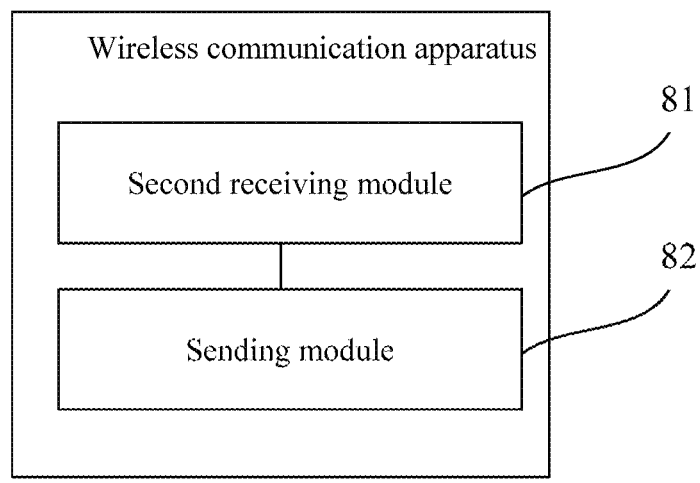
FIG. 8 is a schematic diagram of a wireless communication device according to an example.

As shown in FIG. 8, the present embodiment provides a wireless communication device, applied to a base station, and the apparatus includes a second receiving module 81, where the second receiving module 81 is configured to receive terminal capability information reported by a terminal, and the terminal capability information is at least used for indicating a processing capability of the terminal at different subcarrier spacing (SCS).

In an embodiment, the apparatus further includes a sending module 82 configured to send a scheduling instruction to the terminal based on the terminal capability information.

With regard to the apparatus in the above embodiments, the specific manners in which various modules perform operations have been described in detail in the embodiments relating to the methods, and details are not described herein.

The embodiments of the present disclosure provide a communication device, including:

a processor; and a memory for storing instructions executable by the processor, where the processor is configured to: when executing the executable instructions, implement the method applied to any embodiment of the present disclosure.

The processor may include various types of storage mediums, and the storage medium is a non-transitory computer storage medium and can continue to memorize the information stored in the storage medium after the communication device is powered down.

The processor may be connected to the memory by means of a bus and the like, and is used to read an executable program stored on the memory.

The embodiments of the present disclosure further provide a computer storage medium, storing a computer executable program, where when the executable program is executed by a processor, the method in any embodiment of the present disclosure is implemented.

With regard to the apparatus in the above embodiments, the specific manners in which various modules perform operations have been described in detail in the embodiments relating to the methods, and details are not described herein.

Figure 9:
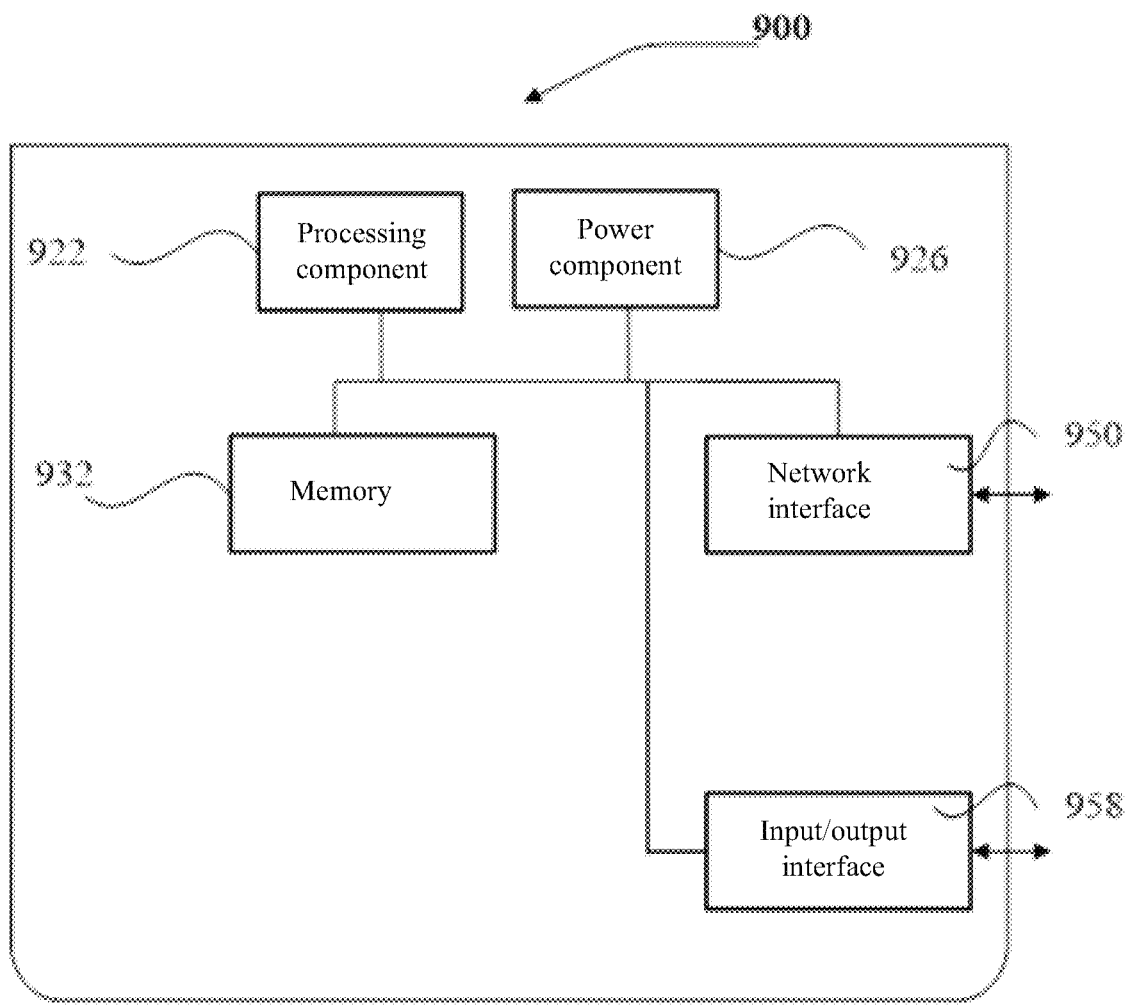
FIG. 9 is a block diagram of a base station according to an example.

As shown in FIG. 9, an embodiment of the present disclosure, shows a structure of a base station. For example, a base station 900 may be provided as a network side device. Referring to FIG. 9, the base station 900 includes a processing component 922, and further includes one or more processors, and a memory resource represented by a memory 932 and used for storing instructions capable of being executed by the processing component 922, such as application programs. The applications stored in the memory 932 may include one or more modules each corresponding to a set of instructions. In addition, the processing component 922 is configured to execute any methods applied to the base station of the above methods.

Those skilled in the art would readily conceive of other implementations of the present disclosure after considering the specification and practicing the invention disclosed here. The present disclosure is intended to cover any variations, uses or adaptive changes of the present disclosure. These variations, uses, or adaptive changes follow the general principle of the present disclosure and include common general knowledge or conventional technical means in the technical field that are not disclosed in the present disclosure. The description and the embodiments are merely regarded as exemplary, and the real scope and spirit of the disclosure are pointed out by the following claims.

It should be understood that the present disclosure is not limited to the precise structure described above and shown in the figures, and various modifications and changes can be made without departing from its scope. The scope of the present disclosure is only limited by the appended claims.

Disclosed in the embodiments of the present disclosure is a wireless communication method, applied to a terminal, the method including:

reporting terminal capability information, where the terminal capability information is at least used for indicating a processing capability of the terminal at different subcarrier spacing (SCS).

In an embodiment, the terminal capability information is used for indicating a capability, supported at different SCS, of the terminal to process a physical downlink shared channel (PDSCH) and/or a physical uplink shared channel (PUSCH).

In an embodiment, the processing capability information includes at least one of:

a number of time slots that are needed for the terminal supports processing one PDSCH at different SCS;

a number of time slots that are needed for the terminal supports processing one PUSCH at different SCS;

a time interval between two adjacent transmissions that is supported by the terminal at different SCS;

a number of PDSCHs that the terminal supports processing in a unit duration at different SCS;
a number of PUSCHs that the terminal supports processing in a unit duration at different SCS; or
a total number of PDSCHs and PUSCHs that the terminal supports processing in a unit duration at different SCS.

In an embodiment, the time interval is:
a time interval between processing two adjacent PDSCHs; or
a time interval between processing two adjacent PUSCHs; or
a time interval between processing the PDSCH and the PUSCH adjacent to the PDSCH.

In an embodiment, the method further includes:
determining the processing capability of the terminal at the SCS subcarrier spacing based on a bandwidth of the SCS.

In an embodiment, the method further includes:
receiving a scheduling instruction sent by the base station; and
skipping the scheduling instruction in response to the number of the PDSCHs and/or PUSCHs scheduled by the base station exceeding the processing capability of the terminal.

According to a second aspect of the embodiments of the present disclosure, a wireless communication method is provided, applied to a base station, the method including:
receiving terminal capability information reported by a terminal, where the terminal capability information is at least used for indicating a processing capability of the terminal at different subcarrier spacing (SCS).

In an embodiment, the terminal capability information is used for indicating a capability, supported at different SCS, of the terminal to process a physical downlink shared channel (PDSCH) and/or a physical uplink shared channel (PUSCH).

In an embodiment, the processing capability information includes at least one of:
a number of time slots that are needed for the terminal supports processing one PDSCH at different SCS;
a number of time slots that are needed for the terminal supports processing one PUSCH at different SCS;
a time interval between two adjacent transmissions that is supported by the terminal at different SCS;
a number of PDSCHs that the terminal supports processing in a unit duration at different SCS;
a number of PUSCHs that the terminal supports processing in a unit duration at different SCS; or
a total number of PDSCHs and PUSCHs that the terminal supports processing in a unit duration at different SCS.

In an embodiment, the time interval is:
a time interval between processing two adjacent PDSCHs; or
a time interval between processing two adjacent PUSCHs; or
a time interval between processing the PDSCH and the PUSCH adjacent to the PDSCH.

In an embodiment, the processing capability of the terminal at the SCS is determined based on a bandwidth of the SCS.

In an embodiment, the method further includes:
sending a processing instruction to the terminal based on the terminal capability information.

According to a third aspect of the embodiments of the present disclosure, a wireless communication apparatus is provided, applied to a terminal, the apparatus including a reporting module, where the reporting module is configured to report terminal capability information, and the terminal capability information is at least used for indicating a processing capability of the terminal at different subcarrier spacing (SCS).

In an embodiment, the apparatus further includes a determining module, where the determining module is configured to: determine the processing capability of the terminal at the SCS subcarrier spacing based on a bandwidth of the SCS.

In an embodiment, the apparatus further includes a first receiving module and a processing module, where
the first receiving module is configured to receive a scheduling instruction sent by the base station; and
the processing module is configured to: skip the scheduling instruction in response to the number of the PDSCHs and/or PUSCHs scheduled by the base station exceeding the processing capability of the terminal.

According to a fourth aspect of the embodiments of the present disclosure, a wireless communication apparatus is provided and applied to a base station, the apparatus including a second receiving module, where
the second receiving module is configured to receive terminal capability information reported by a terminal, and the terminal capability information is at least used for indicating a processing capability of the terminal at different subcarrier spacing (SCS).

In an embodiment, the apparatus further includes a sending module configured to send a scheduling instruction to the terminal based on the terminal capability information.

According to a fifth aspect of the embodiments of the present disclosure, a communication device is provided, including:
a processor; and
a memory for storing instructions executable by the processor,
where the processor is configured to: when executing the executable instructions, implement the method in any embodiment of the present disclosure.

According to a sixth aspect of the embodiments of the present disclosure, a computer storage medium is provided, storing a computer executable program, where when the executable program is executed by a processor, the method in any embodiment of the present disclosure is implemented.

In the embodiments of the present disclosure, terminal capability information is reported, where the terminal capability information is at least used for indicating a processing capability of the terminal at different subcarrier spacing SCS. Since the terminal capability information indicates the processing capability of the terminal at different SCS, after receiving the terminal capability information, the base station can schedule resources based on the processing capability of the terminal at different SCS. Compared with a method of using the same scheduling parameter to schedule resources at different SCS, on the one hand, this method may reduce abnormal data processing caused by sufficient scheduled resources but an insufficient data processing capability of the terminal, which improves the reliability of data transmission; on the other hand, when performing resource scheduling, the base station may schedule resources to the terminal as many as possible based on the processing capability of the terminal, which reduces the times of scheduling and improves the efficiency of resource scheduling.

What is claimed is:
1. A wireless communication method, applied to a terminal, the method comprising:

reporting terminal capability information, wherein the terminal capability information is at least used for indicating a processing capability of the terminal at different subcarrier spacing (SCS).

2. The method according to claim 1, wherein the terminal capability information is used for indicating a capability, supported at different SCS, of the terminal to process a physical downlink shared channel (PDSCH) and/or a physical uplink shared channel (PUSCH).

3. The method according to claim 2, wherein the processing capability information comprises at least one of:
a number of time slots that are needed for the terminal supports processing one PDSCH at different SCS;
a number of time slots that are needed for the terminal supports processing one PUSCH at different SCS;
a time interval between two adjacent transmission that is supported by the terminal at different SCS;
a number of PDSCHs that the terminal supports processing in a unit duration at different SCS;
a number of PUSCHs that the terminal supports processing in a unit duration at different SCS; or
a total number of PDSCHs and PUSCHs that the terminal supports processing in a unit duration at different SCS.

4. The method according to claim 3, wherein the time interval is:
a time interval between processing two adjacent PDSCH.

5. The method according to claim 1 further comprising:
determining the processing capability of the terminal at the SCS subcarrier spacing based on a bandwidth of the SCS.

6. The method according to claim 1 further comprising:
receiving a scheduling instruction sent by base station; and
skipping the scheduling instruction in response to a number of the PDSCHs and/or PUSCHs scheduled by the base station exceeding the processing capability of the terminal.

7. A wireless communication method, applied to a base station, the method comprising:
receiving terminal capability information reported by a terminal, wherein the terminal capability information is at least used for indicating a processing capability of the terminal at different subcarrier spacing SCS.

8. The method according to claim 7, wherein the terminal capability information is used for indicating a capability, supported at different SCS, of the terminal to process a physical downlink shared channel PDSCH and/or a physical uplink shared channel PUSCH.

9. The method according to claim 8, wherein the processing capability information comprises at least one of:
a number of time slots that are needed for the terminal supports processing one PDSCH at different SCS;
a number of time slots that are needed for the terminal supports processing one PUSCH at different SCS;
a time interval between two adjacent transmissions that is supported by the terminal at different SCS;
a number of PDSCHs that the terminal supports processing in a unit duration at different SCS;
a number of PUSCHs that the terminal supports processing in a unit duration at different SCS; or
a total number of PDSCHs and PUSCHs that the terminal supports processing in a unit duration at different SCS.

10. The method according to claim 9, wherein the time interval is:
a time interval between processing two adjacent PDSCH.

11. The method according to claim 7, wherein the processing capability of the terminal at the SCS is determined based on a bandwidth of the SCS.

12. The method according to claim 7 further comprising:
sending a scheduling instruction to the terminal based on the terminal capability information.

13. A communication device, comprising:
an antenna;
a memory; and
a processor that is respectively connected to the antenna and the memory, wherein the processor is configured to: report terminal capability information, wherein the terminal capability information is at least used for indicating a processing capability of the terminal at different subcarrier spacing SCS.

14. A non-transitory computer storage medium storing computer executable instructions, the computer executable instructions when executed by a processor, cause the processor to execute the method according to claim 1.

15. The method according to claim 3, wherein the time interval is:
a time interval between processing two adjacent PUSCHs.

16. The method according to claim 3, wherein the time interval is:
a time interval between processing the PDSCH and the PUSCH adjacent to the PDSCH.

17. The method according to claim 9, wherein the time interval is:
a time interval between processing two adjacent PUSCHs.

18. The method according to claim 9, wherein the time interval is:
a time interval between processing the PDSCH and the PUSCH adjacent to the PDSCH.

19. A communication device, comprising:
an antenna;
a memory; and
a processor that is respectively connected to the antenna and the memory, wherein the processor is configured to control transceiving of the antenna by executing the method according to claim 7.

20. A non-transitory computer storage medium storing computer executable instructions, the computer executable instructions when executed by a processor, cause the processor to execute the method according to claim 7.

* * * * *

UNITED STATES PATENT AND TRADEMARK OFFICE
CERTIFICATE OF CORRECTION

| | | |
|---|---|---|
| PATENT NO. | : 12,348,458 B2 | Page 1 of 1 |
| APPLICATION NO. | : 18/014018 | |
| DATED | : July 1, 2025 | |
| INVENTOR(S) | : Ting Fu | |

It is certified that error appears in the above-identified patent and that said Letters Patent is hereby corrected as shown below:

On the Title Page

In item (56), under "OTHER PUBLICATIONS", in Column 2, Line 6, delete "CATT,"Correction" and insert -- CATT, "Correction --, therefor.

In item (56), under "OTHER PUBLICATIONS", in Column 2, Line 7, delete "30KHz",3GPP" and insert -- 30kHz", 3GPP --, therefor.

In the Specification

In Column 12, Line 50, delete "control channel" and insert -- channel --, therefor.

In Column 12, Line 65, delete "control channel" and insert -- channel --, therefor.

In the Claims

In Column 19, Line 26, in Claim 4, delete "PDSCH." and insert -- PDSCHs. --, therefor.

In Column 20, Line 9, in Claim 10, delete "PDSCH." and insert -- PDSCHs. --, therefor.

Signed and Sealed this
Twenty-eighth Day of October, 2025

John A. Squires
*Director of the United States Patent and Trademark Office*